United States Patent
Yoshida et al.

(10) Patent No.: US 11,760,950 B2
(45) Date of Patent: Sep. 19, 2023

(54) GAS PURIFICATION DEVICE

(71) Applicant: Mitsubishi Heavy Industries Engineering, Ltd., Kanagawa (JP)

(72) Inventors: Kaori Yoshida, Tokyo (JP); Rikio Kan, Hiroshima (JP); Seiji Kakesako, Hiroshima (JP)

(73) Assignee: Mitsubishi Heavy Industries Engineering, Ltd., Kanagawa (JP)

( * ) Notice: Subject to any disclaimer, the term of this patent is extended or adjusted under 35 U.S.C. 154(b) by 418 days.

(21) Appl. No.: 16/979,335

(22) PCT Filed: Mar. 13, 2019

(86) PCT No.: PCT/JP2019/010239
§ 371 (c)(1),
(2) Date: Sep. 9, 2020

(87) PCT Pub. No.: WO2019/177012
PCT Pub. Date: Sep. 19, 2019

(65) Prior Publication Data
US 2021/0002569 A1 Jan. 7, 2021

(30) Foreign Application Priority Data
Mar. 14, 2018 (JP) ................................. 2018-046161

(51) Int. Cl.
*C10K 1/34* (2006.01)
*B01J 19/00* (2006.01)
(Continued)

(52) U.S. Cl.
CPC .............. *C10K 1/34* (2013.01); *B01J 19/0013* (2013.01); *C10K 1/004* (2013.01); *C10K 1/006* (2013.01);
(Continued)

(58) Field of Classification Search
CPC ........ B01D 53/00; B01D 53/34; B01D 53/46; B01D 53/48; B01D 53/52; B01D 53/74;
(Continued)

(56) References Cited

U.S. PATENT DOCUMENTS

| 3,878,289 A | 4/1975 | Beavon |
| 4,981,661 A | 1/1991 | Borsboom et al. |

(Continued)

FOREIGN PATENT DOCUMENTS

| CN | 1221778 A | 7/1999 |
| CN | 101050389 A | 10/2007 |

(Continued)

OTHER PUBLICATIONS

The Office Action issued in corresponding Chinese Application No. 201980009265.9, dated Dec. 31, 2020 (8 pages).

(Continued)

*Primary Examiner* — Natasha E Young
(74) *Attorney, Agent, or Firm* — Osha Bergman Watanabe & Burton LLP

(57) ABSTRACT

A gas purification device includes: a converter packed with a catalyst for hydrolyzing both carbonyl sulfide and hydrogen cyanide; an upstream heat exchanger for heat exchange between a gas to be introduced into the converter and a cooling fluid for cooling the gas; a reaction-temperature estimation member for estimating a reaction temperature inside the converter; and a flow-rate adjustment member for adjusting a flow rate of the cooling fluid flowing into the upstream heat exchanger based on an estimated value of the reaction-temperature estimation member to control the reaction temperature.

7 Claims, 3 Drawing Sheets

(51) Int. Cl.
*C10K 1/00* (2006.01)
*C10K 1/10* (2006.01)

(52) U.S. Cl.
CPC ..... *C10K 1/101* (2013.01); *B01J 2219/00058* (2013.01); *B01J 2219/00164* (2013.01)

(58) Field of Classification Search
CPC .... B01D 53/75; B01D 53/86; B01D 53/8603; B01D 53/8606; B01D 53/8621; B01D 2251/00; B01D 2252/00; B01D 2252/10; B01D 2252/103; B01D 2255/00; B01D 2255/10; B01D 2255/102; B01D 2255/1026; B01D 2255/20; B01D 2255/204; B01D 2255/2042; B01D 2255/207; B01D 2255/20707; B01D 2255/20715; B01D 2255/20746; B01D 2255/20753; B01D 2255/20769; B01D 2255/40; B01D 2257/00; B01D 2257/30; B01D 2257/304; B01D 2257/308; B01D 2257/40; B01D 2257/408; B01D 2258/00; B01D 2258/01; B01D 2258/012; B01J 19/00; B01J 19/0006; B01J 19/0013; B01J 2219/00; B01J 2219/00049; B01J 2219/00051; B01J 2219/00054; B01J 2219/00056; B01J 2219/00058; B01J 2219/00164; C10K 1/00; C10K 1/002; C10K 1/003; C10K 1/004; C10K 1/006; C10K 1/08; C10K 1/10; C10K 1/101; C10K 1/34
See application file for complete search history.

(56) References Cited

U.S. PATENT DOCUMENTS

| | | |
|---|---|---|
| 2013/0345474 A1 | 12/2013 | Hallinan et al. |
| 2014/0369915 A1 | 12/2014 | Yonemura et al. |

FOREIGN PATENT DOCUMENTS

| | | |
|---|---|---|
| CN | 104039440 A | 9/2014 |
| CN | 104884422 A | 9/2015 |
| CN | 207016739 U | 2/2018 |
| GB | 1436257 A | 5/1976 |
| JP | 2617216 B2 | 6/1997 |
| JP | H10-088154 A | 4/1998 |
| JP | H11-080760 A | 3/1999 |
| JP | H11-241076 A | 9/1999 |
| JP | 4227676 B2 | 2/2009 |
| JP | 2011-168628 A | 9/2011 |
| JP | 5955026 B2 | 7/2016 |

OTHER PUBLICATIONS

International Search Report of PCT/JP2019/010239 dated Jun. 4, 2019 (9 pages).
International Preliminary Report on Patentability dated Sep. 24, 2020 in corresponding International (PCT) Application No. PCT/JP2019/010239 (13 pages).

GAS PURIFICATION DEVICE

CROSS-REFERENCE TO RELATED APPLICATIONS

The present application is a national state application claiming priority from International Patent Application No. PCT/JP2019/010239, now WO 2019/177012, filed Mar. 13, 2019, which claims priority from Japanese Patent Application No. 2018-046161 filed Mar. 14, 2018. The contents of both applications are incorporated herein in their entirety.

TECHNICAL FIELD

The present disclosure relates to a gas purification device.

BACKGROUND

Patent Documents 1 and 2 disclose a catalyst capable of hydrolyzing both carbonyl sulfide (COS) and hydrogen cyanide (HCN). However, in such a catalyst, optimum temperatures for hydrolysis reactions of COS and HCN shown below are different.

$$COS + H_2O \rightarrow H_2S + CO_2 \quad (1)$$

$$HCN + H_2O \rightarrow NH_3 + CO \quad (2)$$

The optimum temperature of the reaction (1) is 240° C. to 320° C. The optimum temperature of the reaction (2) is 280° C. to 350° C.

Patent Document 3 discloses a heat exchanger disposed upstream of a converter packed with a catalyst that converts COS contained in a syngas obtained by gasification of coal into hydrogen sulfide ($H_2S$) through the reaction (1). In this heat exchanger, the syngas is cooled, and the syngas at the optimum temperature for the reaction (1) is introduced into the converter.

CITATION LIST

Patent Literature

Patent Document 1: JP2617216B
Patent Document 2: JP5955026B
Patent Document 3: JP4227676B

SUMMARY

Problems to be Solved

When the converter disclosed in Patent Document 3 is packed with the catalyst of Patent Document 1 or 2 to hydrolyze both COS and HCN, the temperature of the syngas may be adjusted in a range of 280° C. to 320° C. which is an optimum temperature range common to the reactions (1) and (2). However, for instance, when the concentration of either COS or HCN increases, and hydrolysis reaction of the component having the increased concentration needs to be accelerated, since the temperature of the syngas cannot be adjusted with the configuration of Patent Document 3, the component having the increased concentration cannot be preferentially hydrolyzed.

In view of the above, an object of at least one embodiment of the present disclosure is to provide a gas purification device that can change the reaction rate of hydrolysis reaction of each component in response to a concentration change of COS and HCN in a gas.

Solution to the Problems

A gas purification device according to at least one embodiment of the present invention comprises: a converter packed with a catalyst for hydrolyzing both COS and HCN; an upstream heat exchanger for heat exchange between a gas to be introduced into the converter and a cooling fluid for cooling the gas; a reaction-temperature estimation member for estimating a reaction temperature inside the converter; and a flow-rate adjustment member for adjusting a flow rate of the cooling fluid flowing into the upstream heat exchanger based on an estimated value of the reaction-temperature estimation member to control the reaction temperature.

With this configuration, by adjusting the flow rate of the cooling fluid used for heat exchange with the gas in the upstream heat exchanger, the reaction temperature in the converter can be controlled. Thus, it is possible to change the reaction rate of hydrolysis reaction of each component in response to a concentration change of COS and HCN in the gas.

In some embodiments, the reaction-temperature estimation member may be a temperature sensor disposed between the upstream heat exchanger and the converter and configured to detect a temperature of the gas flowing into the converter. Since the catalyst is heated by the syngas introduced into the converter, it is considered that the reaction temperature in the steady state is substantially equal to the temperature of the syngas introduced into the converter. With the above configuration, since the temperature of the gas flowing into the converter is used as the estimated value of the reaction temperature, it is possible to relatively accurately estimate the reaction temperature.

In some embodiments, the gas purification device may further comprise: an analysis device disposed upstream of the converter and configured to analyze a concentration of COS and a concentration of HCN in the gas; and a setting-temperature-range determination unit configured to determine a setting temperature range of the reaction temperature based on an analysis result of the analysis device. The flow-rate adjustment member may be configured to adjust the flow rate of the cooling fluid flowing into the upstream heat exchanger such that the estimated value of the reaction-temperature estimation member is within the setting temperature range. With this configuration, since the estimated value of the reaction temperature is controlled to be within the setting temperature range determined based on the analysis result of the COS concentration and the HCN concentration in the gas, it is possible to more accurately change the reaction rate of hydrolysis reaction of each component in response to a concentration change of COS and HCN in the gas.

In some embodiments, the gas purification device may further comprise: a hydrogen-sulfide removal device configured to remove $H_2S$ produced by hydrolysis of COS from the gas flowing out of the converter to produce a purified gas; and a downstream heat exchanger for heat exchange between the gas flowing out of the converter and the purified gas flowing out of the hydrogen-sulfide removal device. The cooling fluid may be the purified gas that has exchanged heat with the gas flowing out of the converter in the downstream heat exchanger. With this configuration, since the purified gas obtained by desulfurization of the gas that has passed through the converter with the hydrogen-sulfide removal device is used as the cooling fluid, it is possible to reduce the gas purification cost compared with the case where the cooling fluid is separately prepared.

In some embodiments, the gas purification device may further comprise a supply source of steam having a lower temperature than the gas to be introduced into the converter. The cooling fluid may be the steam supplied from the supply source. In this case, the supply source may be a steam turbine. With the above configuration, in the case of a facility using steam, since a part of the steam is used as the cooling fluid, it is possible to reduce the gas purification cost compared with the case where the steam is separately prepared.

In some embodiments, the gas to be introduced into the converter may be a syngas obtained by gasification of coal. With this configuration, in an integrated coal gasification combined cycle power plant, it is possible to change the reaction rate of hydrolysis reaction of each component in response to a concentration change of COS and HCN in the syngas.

Advantageous Effects

According to at least one embodiment of the present disclosure, by adjusting the flow rate of the cooling fluid used for heat exchange with the gas in the upstream heat exchanger, the reaction temperature in the converter can be controlled. Thus, it is possible to change the reaction rate of hydrolysis reaction of each component in response to a concentration change of COS and HCN in the gas.

DETAILED DESCRIPTION

Embodiments of the present invention will now be described in detail with reference to the accompanying drawings. However, the scope of the present invention is not limited to the following embodiments. It is intended that dimensions, materials, shapes, relative positions and the like of components described in the embodiments shall be interpreted as illustrative only and not intended to limit the scope of the present invention.

First Embodiment

Figure 1:
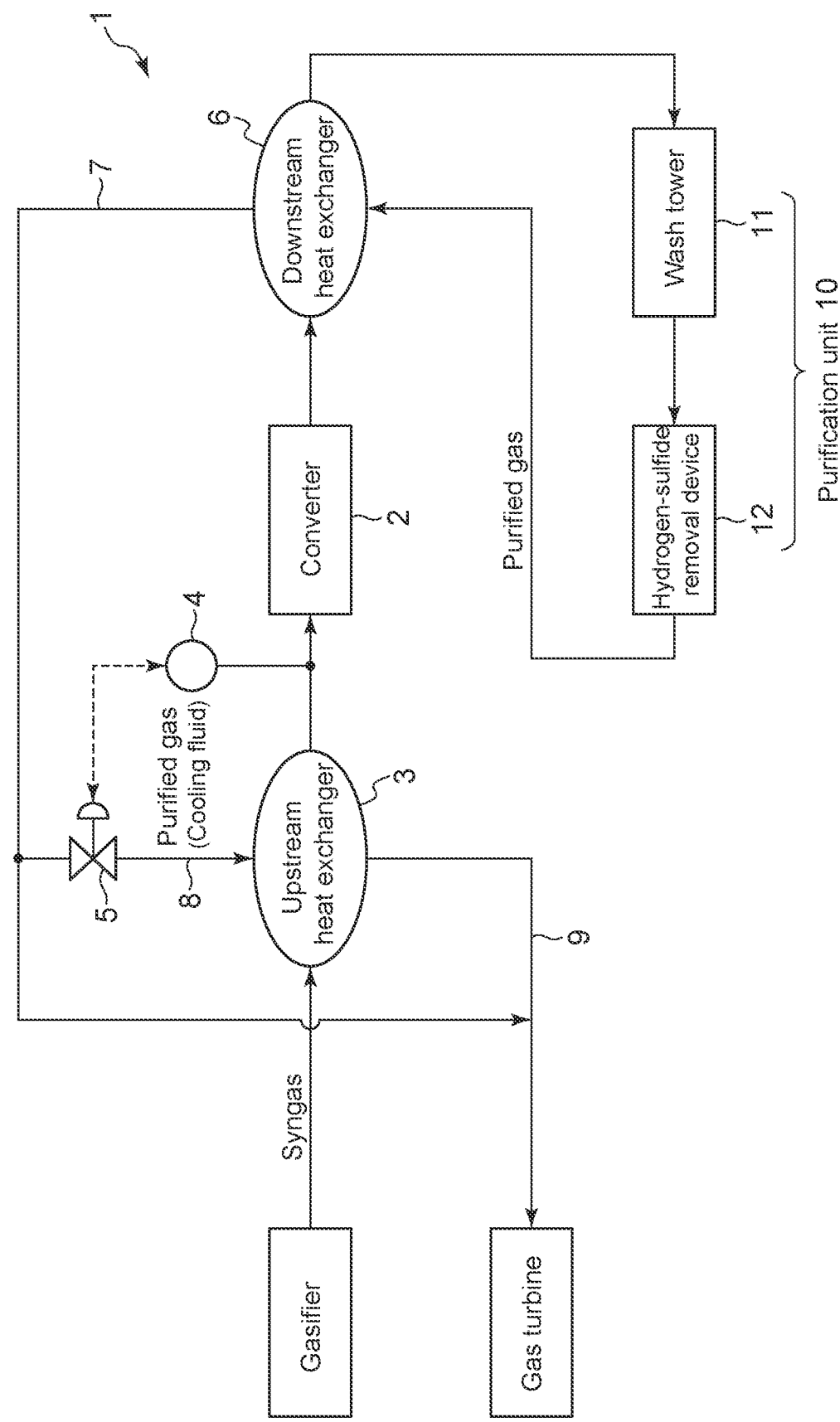
FIG. 1 is a schematic configuration diagram of a gas purification device according to a first embodiment of the present disclosure.

FIG. 1 shows a gas purification device 1 according to a first embodiment of the present disclosure. The gas purification device 1 is a device for purifying a syngas obtained by gasification of coal in a gasifier of an integrated coal gasification combined cycle power plant, more specifically, for removing COS and HCN in the syngas. The gas purification device 1 includes a converter 2 packed with a catalyst for hydrolyzing both COS and HCN, an upstream heat exchanger 3 for heat exchange between a syngas to be introduced into the converter 2 and a cooling fluid for cooling the syngas, a temperature sensor 4 disposed between the upstream heat exchanger 3 and the converter 2 to detect the temperature of the syngas flowing into the converter 2, and a flow-rate adjustment valve 5 which is a flow-rate adjustment member for adjusting the flow rate of the cooling fluid flowing into the upstream heat exchanger 3.

The catalyst packed in the converter 2 is a catalyst for hydrolyzing both COS and HCN. The catalyst may be a catalyst in which an active component mainly containing at least one of barium, nickel, ruthenium, cobalt, or molybdenum is supported on a titanium oxide-based carrier. In this catalyst, the titanium oxide-based carrier is at least one of a composite oxide of titanium oxide and silicon oxide, a composite oxide of titanium oxide and aluminum oxide, or a composite oxide of titanium oxide and zirconium oxide, and at least one of barium carbonate, nickel carbonate, ruthenium nitrate, cobalt carbonate, or ammonium molybdate is added to the titanium oxide-based carrier.

Figure 2:
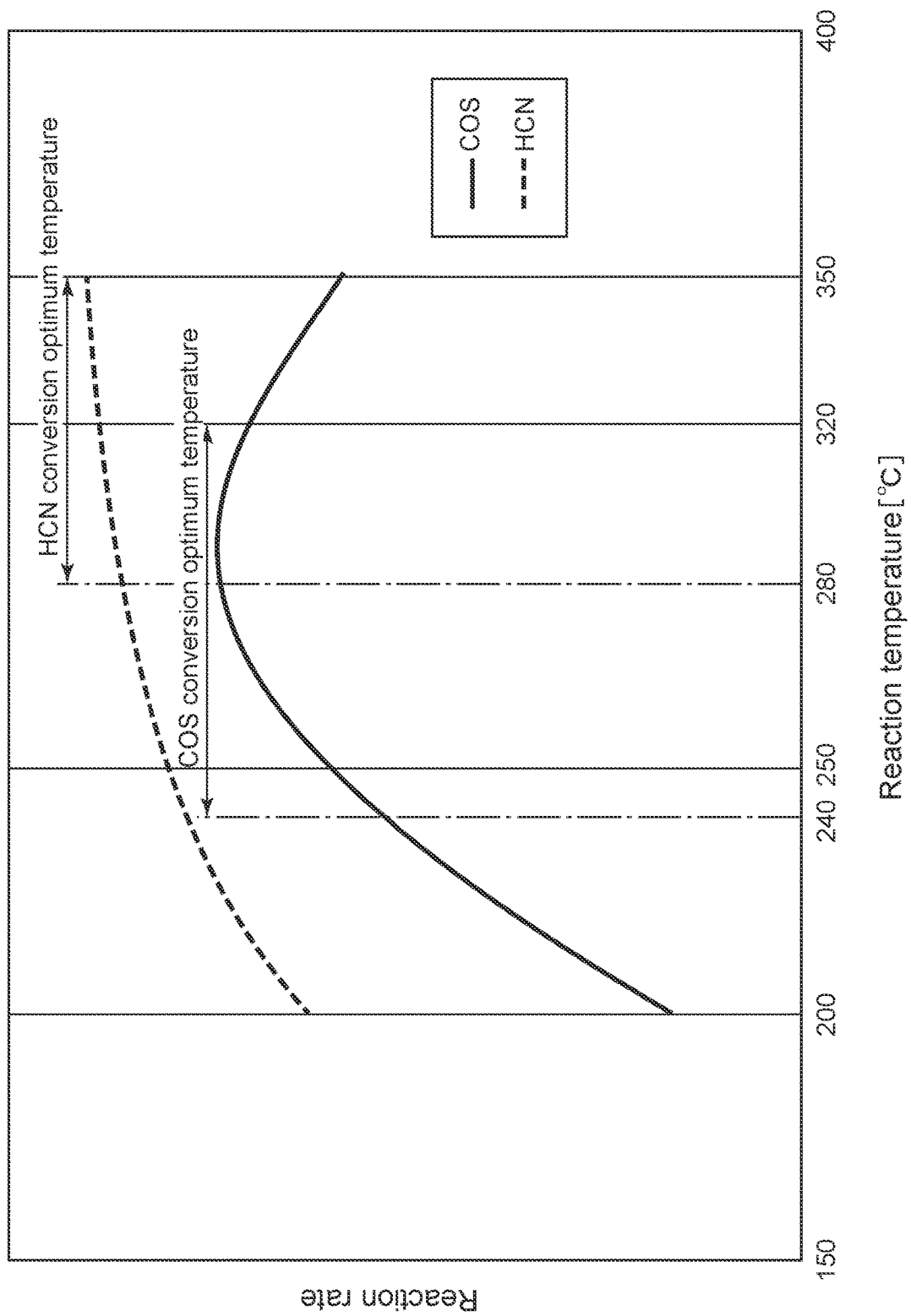
FIG. 2 is a graph schematically showing a relationship between reaction rate and reaction temperature of a catalyst packed in a converter of the gas purification device according to the first embodiment of the present disclosure.

The graph of FIG. 2 schematically shows a relationship between reaction rate of COS and HCN and reaction temperature for hydrolysis reaction of COS and HCN using the catalyst packed in the converter 2. From the relationship between reaction temperature and reaction rate and relationship with other components contained in the syngas, the optimum temperature range of COS hydrolysis reaction (hereinafter, referred to as "COS conversion optimum temperature") using the catalyst packed in the converter 2 is determined to be 240 to 320° C., and the optimum temperature range of HCN hydrolysis reaction (hereinafter referred to as "HCN conversion optimum temperature") using the same is determined to be 280 to 350° C. The COS conversion optimum temperature and the HCN conversion optimum temperature are different from each other although they partially overlap in a common temperature range (280 to 320° C.).

Therefore, in the converter 2, in order for the catalyst to function so as to obtain the target reaction rates for COS and HCN, it is important to control the reaction temperature. However, it is difficult to accurately detect the reaction temperature. Since the catalyst is heated by the syngas introduced into the converter 2, it is considered that the reaction temperature in the steady state is substantially equal to the temperature of the syngas introduced into the converter 2. Therefore, in the first embodiment, as shown in FIG. 1, the temperature of the syngas flowing into the converter 2 is detected by the temperature sensor 4, and the detected value is used as an estimated value of the reaction temperature. Thus, the temperature sensor 4 constitutes a reaction-temperature estimation member for estimating the reaction temperature inside the converter 2.

The cooling fluid used for heat exchange with the syngas in the upstream heat exchanger 3 may be any fluid that has a lower temperature than the syngas. In the first embodiment, as the cooling fluid, a purified gas obtained by desulfurization of the syngas that has passed through the converter 2 is used. The gas purification device 1 further includes a purification unit 10 for purifying the syngas having passed through the converter 2 to produce a purified gas, and a downstream heat exchanger 6 for heat exchange between the syngas flowing out of the converter 2 and the purified gas. The purification unit 10 includes a wash tower 11 configured to bring the syngas and water into contact to cool the syngas, and a hydrogen-sulfide removal device 12 configured to remove $H_2S$ produced by hydrolysis of COS from the cooled syngas to produce a purified gas.

A branch pipe 8 communicating with the upstream heat exchanger 3 diverges from a middle portion of a pipe 7 through which the purified gas that has exchanged heat with the syngas in the downstream heat exchanger 6 flows. The flow-rate adjustment valve 5 is disposed on the branch pipe 8. The pipe 7 is jointed to a pipe 9 through which the purified gas that has exchanged heat with the syngas in the upstream heat exchanger 3 flows. The pipe 9 communicates with a gas turbine of the integrated coal gasification combined cycle power plant.

Next, operation of the gas purification device 1 according to the first embodiment will be described.

As shown in FIG. 1, the syngas from the gasifier contains COS and HCN. The concentrations of COS and HCN in the syngas are roughly determined by the type of coal fed to the gasifier. Therefore, concentrations of COS and HCN in the syngas that are assumed when standard coal is fed to the gasifier are defined as planned values of the concentrations of COS and HCN. The appropriate reaction rate of each component is determined based on each planned value, and the setting temperature range of the reaction temperature of the converter 2 is determined based on each reaction rate.

In the first embodiment, when the standard coal is fed to the gasifier, i.e., when the concentrations of COS and HCN in the syngas are the planned values, the gas purification device 1 is operated under conditions that accelerate both hydrolysis reactions of COS and HCN. In this case, the setting temperature range of the reaction temperature is set to a common temperature range (280 to 320° C.) in which the COS conversion optimum temperature and the HCN conversion optimum temperature overlap (see FIG. 2). This setting temperature range is for illustrative purpose only, and the setting temperature range when the concentration of each component is the planned value may be determined in any way.

The syngas from the gasifier exchanges heat with the purified gas as the cooling fluid in the upstream heat exchanger 3, and is cooled to a temperature within the setting temperature range of the reaction temperature. The temperature control of the syngas is performed by detecting the temperature of the syngas flowing out of the upstream heat exchanger 3 by the temperature sensor 4, and adjusting the opening degree of the flow-rate adjustment valve 5 such that the detected value is within the setting temperature range. For instance, when the detected value of the temperature sensor 4 is higher than the setting temperature range (e.g., 350° C.), it is necessary to increase the cooling capacity of the syngas in the upstream heat exchanger 3. Accordingly, the opening degree of the flow-rate adjustment valve 5 is increased to increase the flow rate of the purified gas flowing into the upstream heat exchanger 3. Conversely, when the detected value of the temperature sensor 4 is lower than the setting temperature range (e.g., 250° C.), it is necessary to decrease the cooling capacity of the syngas in the upstream heat exchanger 3. Accordingly, the opening degree of the flow-rate adjustment valve 5 is decreased to decrease the flow rate of the purified gas flowing into the upstream heat exchanger 3.

When the syngas with temperature controlled within the setting temperature range in the upstream heat exchanger 3 is introduced into the converter 2, the catalyst in the converter 2 is heated by the syngas, so that the temperature of the catalyst becomes equal to the temperature of the syngas, i.e., the temperature is within the setting temperature range in the steady state. Thus, the reaction temperature inside the converter 2 is controlled within the setting temperature range. In the converter 2, COS and HCN are hydrolyzed by the catalyst. Each hydrolysis reaction proceeds at a reaction rate (see FIG. 2) depending on the reaction temperature. By each hydrolysis reaction, COS is converted into $H_2S$ and $CO_2$, and HCN is converted into $NH_3$ and CO.

The syngas flowing out of the converter 2 exchanges heat with the purified gas in the downstream heat exchanger 6, and is cooled. Then, the syngas is introduced into the wash tower 11 and is cooled. The syngas is then introduced into the hydrogen-sulfide removal device 12 for removing $H_2S$ to produce a purified gas. As described above, the purified gas is heated by heat exchange with the syngas in the downstream heat exchanger 6. The purified gas heated in the downstream heat exchanger 6 flows through the pipe 7, and a part of the purified gas flows into the upstream heat exchanger 3 via the branch pipe 8 and is heated by heat exchange with the syngas, as described above. The purified gas heated in the upstream heat exchanger 3 flows out of the upstream heat exchanger 3 to the pipe 9. The remainder of the purified gas flowing through the pipe 7 flows into the pipe 9, and joins with the purified gas flowing through the pipe 9. The purified gas is introduced into the gas turbine through the pipe 9.

When the type of coal fed to the gasifier is changed, the expected concentrations of COS and HCN in the syngas may change. If the concentration of one of COS or HCN increases, it is necessary to change the setting temperature range of the reaction temperature so as to accelerate hydrolysis reaction of the component having the increased concentration.

For instance, consider the case where the concentration of COS is not changed while the concentration of HCN is increased higher than the planned value. In this case, as shown in FIG. 2, the setting temperature range is changed to, for example, 280 to 350° C. in order to increase the reaction rate of hydrolysis reaction of HCN. In this temperature range, the reaction rate of hydrolysis reaction of COS may be reduced to some extent as compared with the unchanged temperature range (280 to 320° C.), but the reaction rate of hydrolysis reaction of HCN is preferentially increased in response to the increase in the concentration of HCN. Conversely, when the concentration of HCN is not changed while the concentration of COS is increased higher than the planned value, the setting temperature range is changed to, for example, 240 to 320° C. in order to increase the reaction rate of hydrolysis reaction of COS. In this case, the reaction rate of hydrolysis reaction of HCN may be reduced to some extent as compared with the unchanged temperature range, but the reaction rate of hydrolysis reaction of COS is preferentially increased in response to the increase in the concentration of COS.

As shown in FIG. 1, when the setting temperature range of the reaction temperature is changed, the flow rate of the purified gas flowing into the upstream heat exchanger 3 as the cooling fluid is changed by changing the opening degree of the flow-rate adjustment valve 5 in order to change the temperature of the syngas flowing into the converter 2. By changing the setting temperature range of the reaction temperature, the reaction rate of hydrolysis reaction of either one of COS or HCN is changed in response to a concentration change of COS and HCN.

As described above, by adjusting the flow rate of the purified gas as the cooling fluid used for heat exchange with the syngas in the upstream heat exchanger 3, the reaction temperature can be controlled. Thus, it is possible to change the reaction rate of hydrolysis reaction of each component in response to a concentration change of COS and HCN in the gas.

Second Embodiment

Next, a gas purification device according to the second embodiment will be described. The gas purification device according to the second embodiment differs from the first embodiment in that it is configured to analyze the concentrations of CON and HCN in the syngas flowing into the converter, and control the reaction temperature based on the analysis result. In the second embodiment, the same constituent elements as those in the first embodiment are associated with the same reference numerals and not described again in detail.

Figure 3:
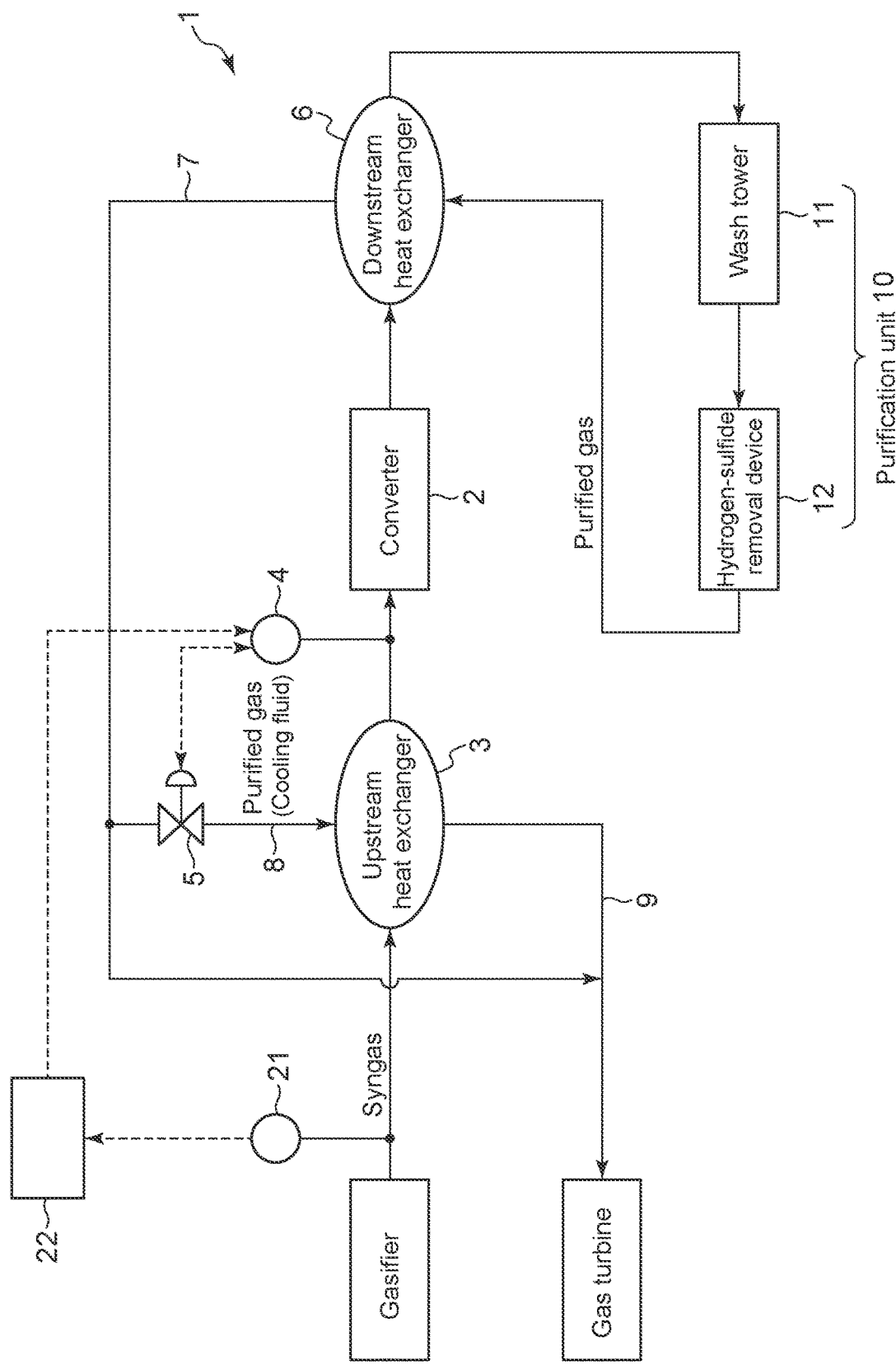
FIG. 3 is a schematic configuration diagram of a gas purification device according to a second embodiment of the present disclosure.

As shown in FIG. 3, the gas purification device 1 according to the second embodiment includes an analysis device 21 disposed between the gasifier and the upstream heat exchanger 3, and a setting-temperature-range determination unit 22 electrically connected to the analysis device 21 and to the temperature sensor 4. The analysis device 21 serves to analyze the concentrations of COS and HCN in the syngas. The setting-temperature-range determination unit 22 serves to determine the setting temperature range of the reaction temperature based on the analysis result of the analysis device 21, and is incorporated in, for example, a computer which controls the operation of the integrated coal gasification combined cycle power plant. The configuration is otherwise the same as that of the first embodiment.

In the first embodiment, when the concentrations of COS and HCN in the syngas may be changed due to, for example, the change in the type of coal fed to the gasifier, it is assumed that the setting temperature range of the reaction temperature is manually changed on the computer which controls the operation of the integrated coal gasification combined cycle power plant. However, the second embodiment differs from the first embodiment in that, during operation of the gas purification device 1, the analysis device 21 measures the concentrations of COS and HCN in the syngas, and the setting-temperature-range determination unit 22 determines the setting temperature range based on the concentrations, to adjust the flow rate of the purified gas flowing into the upstream heat exchanger 3 such that the reaction temperature inside the converter 2 is within the setting temperature range. The operation different from the first embodiment will be described below.

For instance, when the concentration of HCN is increased higher than the planned value, the setting-temperature-range determination unit 22 changes the setting temperature range to, for example, 280 to 320° C. in order to increase the reaction rate of hydrolysis reaction of HCN. For instance, when the concentration of CON is increased higher than the planned value, the setting-temperature-range determination unit 22 changes the setting temperature range to, for example, 240 to 320° C. in order to increase the reaction rate of hydrolysis reaction of COS. Instead of determining the setting temperature range depending on whether the concentration of each of HCN and COS is higher or lower than the planned value, the setting temperature range may be finely determined so as to correspond to the concentration of each component. The operation of adjusting the flow rate of the purified gas flowing into the upstream heat exchanger 3 to control the reaction temperature within the changed setting temperature range is the same as that in the first embodiment.

As described above, since the reaction temperature is controlled to be within the setting temperature range determined based on the analysis result of the COS concentration and the HCN concentration in the syngas, it is possible to more accurately change the reaction rate of hydrolysis reaction of each component in response to a concentration change of COS and HCN in the gas.

Although in the first and second embodiments, the temperature sensor 4 is disposed upstream of the upstream heat exchanger 3, embodiments are not limited thereto. When the concentrations of COS and HCN in the syngas are on the order of ppm, the amount of heat released during hydrolysis in the converter 2 is small, so the temperature of the syngas flowing into the converter 2 is substantially the same as the temperature of the syngas flowing out of the converter 2. Therefore, the temperature sensor 4 may be disposed downstream of the converter 2, i.e., between the converter 2 and the downstream heat exchanger 6. Depending on the configuration of the converter 2, the temperature sensor 4 may be disposed so as to detect the temperature inside the converter 2.

Although in the first and second embodiments, the reaction-temperature estimation member is the temperature sensor 4, it is not limited thereto. The reaction-temperature estimation member may be a unit for calculating the temperature of the syngas flowing into the converter 2. For instance, when the temperature and flow rate of the syngas from the gasifier and the temperature and flow rate of the purified gas flowing into the upstream heat exchanger 3 are known, the temperature of the syngas flowing out of the upstream heat exchanger 3, i.e., the temperature of the syngas flowing into the converter 2 can be calculated. In this case, the reaction-temperature estimation member may include a detector for detecting the temperature and flow rate of the syngas, a detector for detecting the temperature and flow rate of the purified gas flowing into the upstream heat exchanger 3, and a calculator for calculating the temperature of the syngas flowing into the converter 2 based on the detected values of the detectors.

In the first and second embodiments, the cooling fluid used in the upstream heat exchanger 3 is the purified gas obtained by desulfurization of the syngas that has passed through the converter 2, but the cooling fluid is not limited to the purified gas. As described above, the cooling fluid may be any fluid that has a lower temperature than the syngas, for example, steam having a lower temperature than the syngas. To supply steam to the upstream heat exchanger 3, a supply source having any configuration may be provided in the gas purification device 1.

In the case where the gas purification device 1 is a part of an integrated coal gasification combined cycle power plant, the steam supply source may be a steam turbine, and steam extracted from an outlet of a high-pressure turbine or an intermediate-pressure turbine of the steam turbine may be used as the cooling fluid. In this case, it is possible to reduce the gas purification cost compared with the case where the steam is separately prepared.

In the first and second embodiments, the gas purification device 1 has been described as a part of the integrated coal gasification combined cycle power plant, but the embodiment is not limited thereto. The gas purification device 1 can be provided in any facility.

REFERENCE SIGNS LIST

1 Gas purification device
2 Converter
3 Upstream heat exchanger
4 Temperature sensor (Reaction-temperature estimation member)
5 Flow-rate adjustment valve (Flow-rate adjustment member)
6 Downstream heat exchanger
7 Pipe
8 Branch pipe
9 Pipe 10 Purification unit
11 Wash tower
12 Hydrogen-sulfide removal device
21 Analysis device
22 Setting-temperature-range determination unit

The invention claimed is:

1. A gas purification device comprising:
    a converter packed with a catalyst for hydrolyzing both carbonyl sulfide and hydrogen cyanide;
    an upstream heat exchanger for heat exchange between a gas to be introduced into the converter and a cooling fluid for cooling the gas;
    a reaction-temperature estimation member for estimating a reaction temperature inside the converter; and
    a flow-rate adjustment member for adjusting a flow rate of the cooling fluid flowing into the upstream heat exchanger based on an estimated value of the reaction-temperature estimation member to control the reaction temperature,
    wherein, if a concentration of one of carbonyl sulfide or hydrogen cyanide in the gas increases, the flow-rate adjustment member controls the reaction temperature so as to accelerate hydrolysis reaction of the one of carbonyl sulfide or hydrogen cyanide in the gas having the increased concentration.

2. The gas purification device according to claim 1, wherein the reaction-temperature estimation member is a temperature sensor disposed between the upstream heat exchanger and the converter and configured to detect a temperature of the gas flowing into the converter.

3. The gas purification device according to claim 1, further comprising:
    an analysis device disposed upstream of the converter and configured to analyze a concentration of carbonyl sulfide and a concentration of hydrogen cyanide in the gas; and
    a setting-temperature-range determination unit configured to determine a setting temperature range of the reaction temperature based on an analysis result of the analysis device,
    wherein the flow-rate adjustment member is configured to adjust the flow rate of the cooling fluid flowing into the upstream heat exchanger such that the estimated value of the reaction-temperature estimation member is within the setting temperature range.

4. The gas purification device according to claim 1, further comprising:
    a hydrogen-sulfide removal device configured to remove hydrogen sulfide produced by hydrolysis of carbonyl sulfide from the gas flowing out of the converter to produce a purified gas; and
    a downstream heat exchanger for heat exchange between the gas flowing out of the converter and the purified gas flowing out of the hydrogen-sulfide removal device,
    wherein the cooling fluid is the purified gas that has exchanged heat with the gas flowing out of the converter in the downstream heat exchanger.

5. The gas purification device according to claim 1, further comprising a supply source of steam having a lower temperature than the gas to be introduced into the converter,
    wherein the cooling fluid is the steam supplied from the supply source.

6. The gas purification device according to claim 5, wherein the supply source is a steam turbine.

7. The gas purification device according to claim 1, wherein the gas to be introduced into the converter is a syngas obtained by gasification of coal.

* * * * *